Aug. 15, 1950  T. T. TUCKER  2,519,162
ACOUSTIC TESTING STRUCTURE INCLUDING
SOUND ABSORBING PANELS
Filed March 15, 1948  7 Sheets-Sheet 1

INVENTOR.
Thomas T. Tucker
BY
Geo. B Pitts
ATTORNEY

Aug. 15, 1950

T. T. TUCKER 2,519,162

ACOUSTIC TESTING STRUCTURE INCLUDING
SOUND ABSORBING PANELS

Filed March 15, 1948

INVENTOR.
THOMAS T. TUCKER
BY
Geo. B. Ritter
ATTORNEY

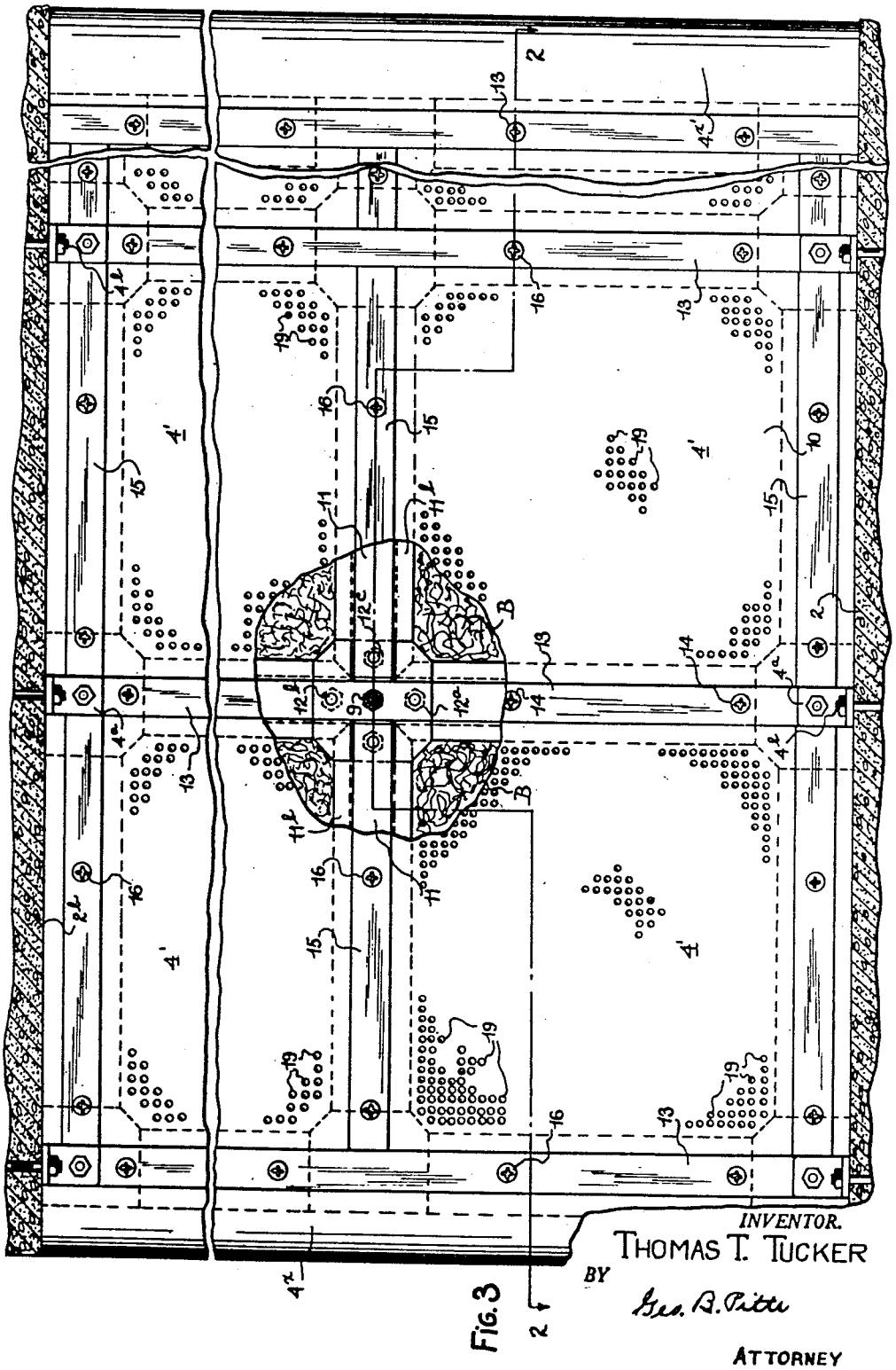

UNITED STATES PATENT OFFICE 2,519,162

ACOUSTIC TESTING STRUCTURE INCLUDING SOUND ABSORBING PANELS

Thomas T. Tucker, Atlanta, Ga.

Application March 15, 1948, Serial No. 15,027

7 Claims. (Cl. 181—33)

This invention relates to apparatus for testing various mechanisms, more particularly high speed mechanisms and devices, such as aircraft engines and/or aircraft propellers, the operating conditions and efficiency of which are to be determined. In this application of the invention, I provide acoustical walls (such as the floors, side walls and ceiling) and/or a set or sets of spaced walls, each incorporating therein suitable sound absorbing media, having foraminous facing sheets constructed to withstand sound waves having high intensities and high wind velocities.

As the power output of engines used for transport has increased, so have noise emissions therefrom. Engines for air transport require testing upon completion and after each overhaul thereof. As such engines have increased in complexity and power output and aircraft are now attaining speeds in the sonic and supersonic range, tests for these engines require a considerable array of scientific instruments and personnel. For which reasons protection from destructive forces, such as sound intensities and wind velocities, must be provided.

As individual power plants were increased in horsepower output, it became necessary to add to the structural strength of the sound baffles. Under the energy waves of normal use, the foraminous sheathing ripples much like the surface of water when there is an air current. A critical point was reached when the energy impact on the foraminous sheathing produced fatigue and breakdown within the sheathing. No amount of additional structural members could halt this disintegration and permit constant increase in energy impact. To meet this problem I have found that tensioning of the foraminous sheathing insures its longevity under high energy impacts. As the elastic limit of the sheathing is approached fatigue moves toward zero. Tensioning of the foraminous sheathing will lessen vibrations under impact of high wind velocities and noise intensities. By maintaining the foraminous sheathing in tension, it becomes a functional part of the assembly and its tensile strength is utilized to impart structural strength thereto. Thus the entire acoustical baffle becomes a unitary construction with an extremely high strength-weight ratio which will flex under energy impact within the elastic limits of the foraminous sheathing.

Accordingly, by supporting and maintaining the foraminous sheets under tension on a framework, the tensile strength thereof is incorporated in the wall assembly, with the result that the latter is capable of withstanding constant heavy impact of complicated sound and wind energies.

One object of the invention is to provide in apparatus of this character an improved sound absorbing wall consisting of sound absorbing media and foraminous facing sheet or sheets therefor, each of the facing sheets being supported in a plane under tension and arranged to prevent displacement of the media or portions thereof due to impact of the sound waves with the facing sheets and to permit unobstructed transmission of sound through the media.

Another object of the invention is to provide an improved acoustical wall having foraminous sheathing or facing sheets supported under tension to form a unitary assembly of high strength-weight ratio capable of flexing under energy impacts within the elastic limits of the sheathing and withstand constant heavy impact of complicated sound and wind energies.

Another object of the invention is to provide an improved sound absorbing baffle the facings of which consist of tensioned foraminous metal sheets adapted to reduce vibrations thereof energized by high wind velocities and noise intensities.

Another object of the invention is to provide in apparatus of this character improved sound absorbing walls in spaced side-by-side relation, each of a desired area, each surface of the wall consisting of alined sections of foraminous metal sheets secured to and supported under tension by a skeleton framework, whereby the tensile strength of the sheets is utilized to resist high wind velocities and sound waves of high intensity, the framework being spacedly connected by bolts, whereby the space between the tensioned sheets accommodates the sound absorbing material.

Another object of the invention is to provide in apparatus of this character improved sound absorbing walls spaced in side-by-side relation each of any desired area and having opposite streamlined surfaces consisting of sections of foraminous metallic sheets each supported to resist transverse pressure and rippling without permanent distortion thereof.

Another object of the invention is to provide in apparatus of this character improved sound absorbing walls spaced in side-by-side relation, each of any desired area and having spaced streamlined surfaces each consisting of foraminous metallic sheets supported under tension.

Another object of the invention is to provide in apparatus of this character an improved acoustical wall, the sound absorbing material of which is provided with relatively thin foraminous facing sheets interlocked to their supporting elements and tensioned throughout their areas to prevent rippling due to shock of sound energy and/or high air velocity.

Another object of the invention is to provide in apparatus of this character an acoustic wall the sound absorbing material of which is provided with foraminous facing sheets having supporting elements between the marginal portions of adjacent sheets devoid of protruding parts or edges and arranged to provide maximum area for transmission of sound into and through the sound absorbing material.

Another object of the invention is to provide in apparatus of this character improved sound absorbing walls, each containing sound absorbing media having a substantially uniform density devoid of reflecting surfaces and barriers and sectional foraminous facing sheets therefor formed of relatively thin metal sheets, each supported under tension to utilize the tensile strength thereof and capable of resisting high impact wave pressures and maintaining the media in uniform condition.

Another object of the invention is to provide in apparatus of this character, an improved sound absorbing wall or walls constructed to provide a substantially continuous body of sound absorbing media throughout the length and/or breadth of a wall or room, to insure a large sound absorbing area and full unobstructed flow of sound energy into the media.

Another object of the invention is to provide an improved apparatus of this character having a set of spaced acoustical members each comprising spacedly connected rows of supporting elements, sections of foraminous metallic facing sheets fixed along their marginal edges to the supporting elements of each row under tension and sound absorbing material in the space between the facing sheets, whereby the tensile strength of the facing sheets is utilized to provide a unitary assembly capable of flexing under energy impact within the elastic limit of the facing sheets.

Another object of the invention is to provide an acoustic wall the parts of which are readily assembled and inter-connected so as to eliminate braces and struts and welding operations.

Another object of the invention is to provide in apparatus of this character improved supporting means for the sound absorbing media, consisting of standardized supporting elements and metallic foraminous facing sheets, all of which may be shipped in knock-down condition capable of being readily manually assembled, whereby the cost of materials and expense of erection are materially reduced, and assembly to room size is facilitated.

A further object of the invention consists in providing certain improvements in the form of construction shown in my co-pending application Ser. No. 467,963, filed December 5, 1942, whereby greater efficiency is attained.

Other objects of the invention will be apparent to those skilled in the art to which my invention relates from the following description taken in connection with the accompanying drawings, wherein Fig. 1 is a perspective view diagrammatically showing a structure embodying my invention.

Fig. 3 is a section on the line 3—3 of Fig. 2.

Figure 1:
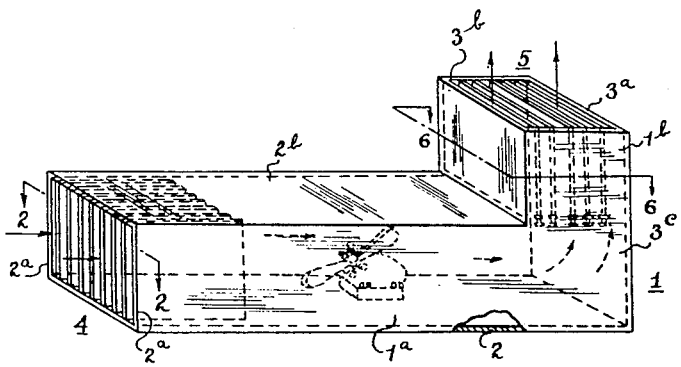

In the drawings, 1 indicates as an entirety a structure or building preferably consisting of an elongated horizontal section $1a$ and a vertical section $1b$ open at its upper end and connected to the inner end of the horizontal section; the outer end of the latter section $1a$ is open for intake of air. The structure 1 is shown diagrammatically, for which reason the means of ingress and egress and other equipment are not shown. The section $1a$ consists of a bottom wall 2, side walls $2a$ and a top wall $2b$. The section $1b$ consists of inner and outer side walls, 3, $3a$, and lateral side walls $3b$, $3c$, in line with the walls $2a$ of the section $1a$. Each of these walls may be formed of suitable material, preferably reinforced concrete, of any desired thickness.

Figure 6:
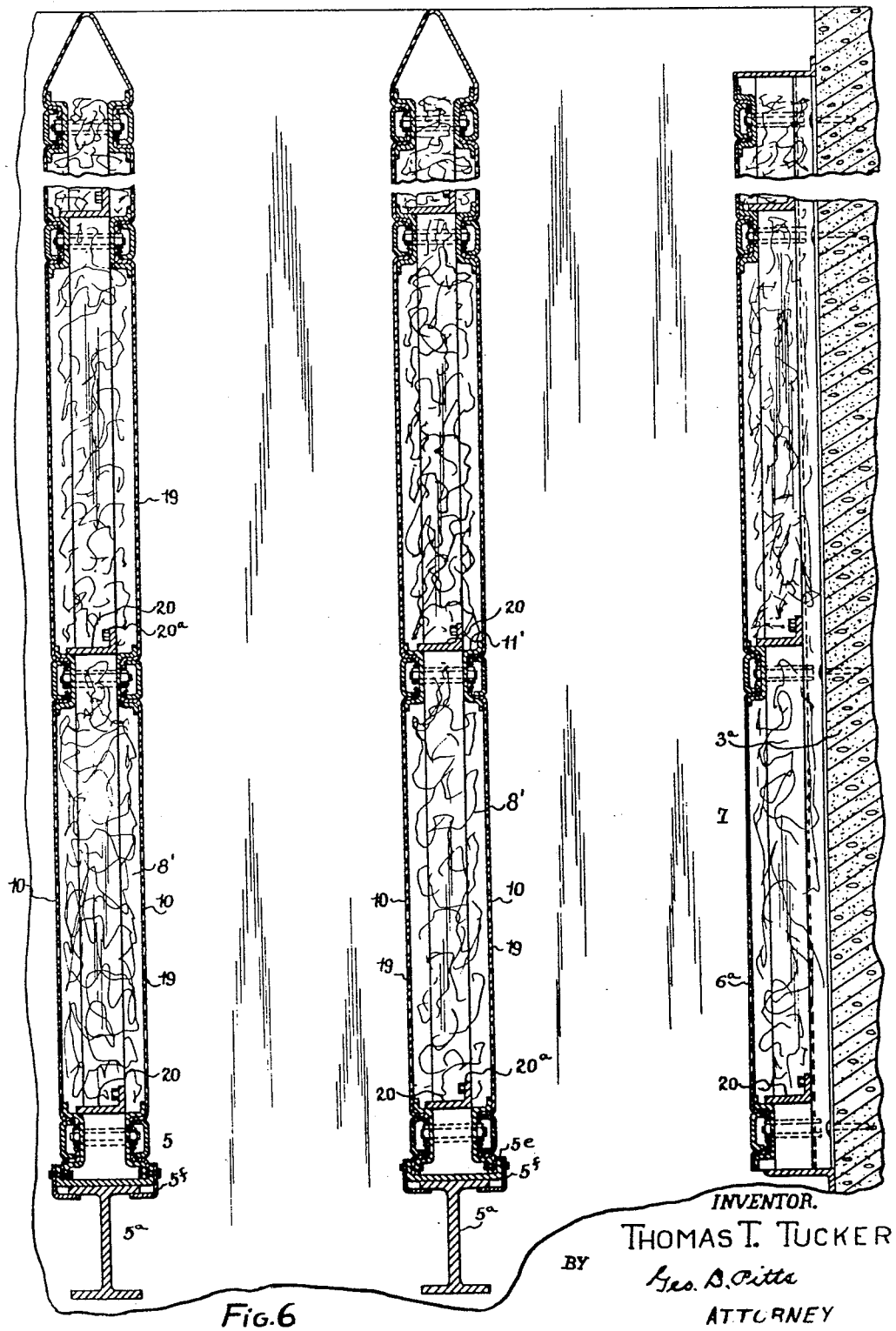
Fig. 6 is a vertical section on the line 6—6 of Fig. 1, enlarged.
Figure 7:
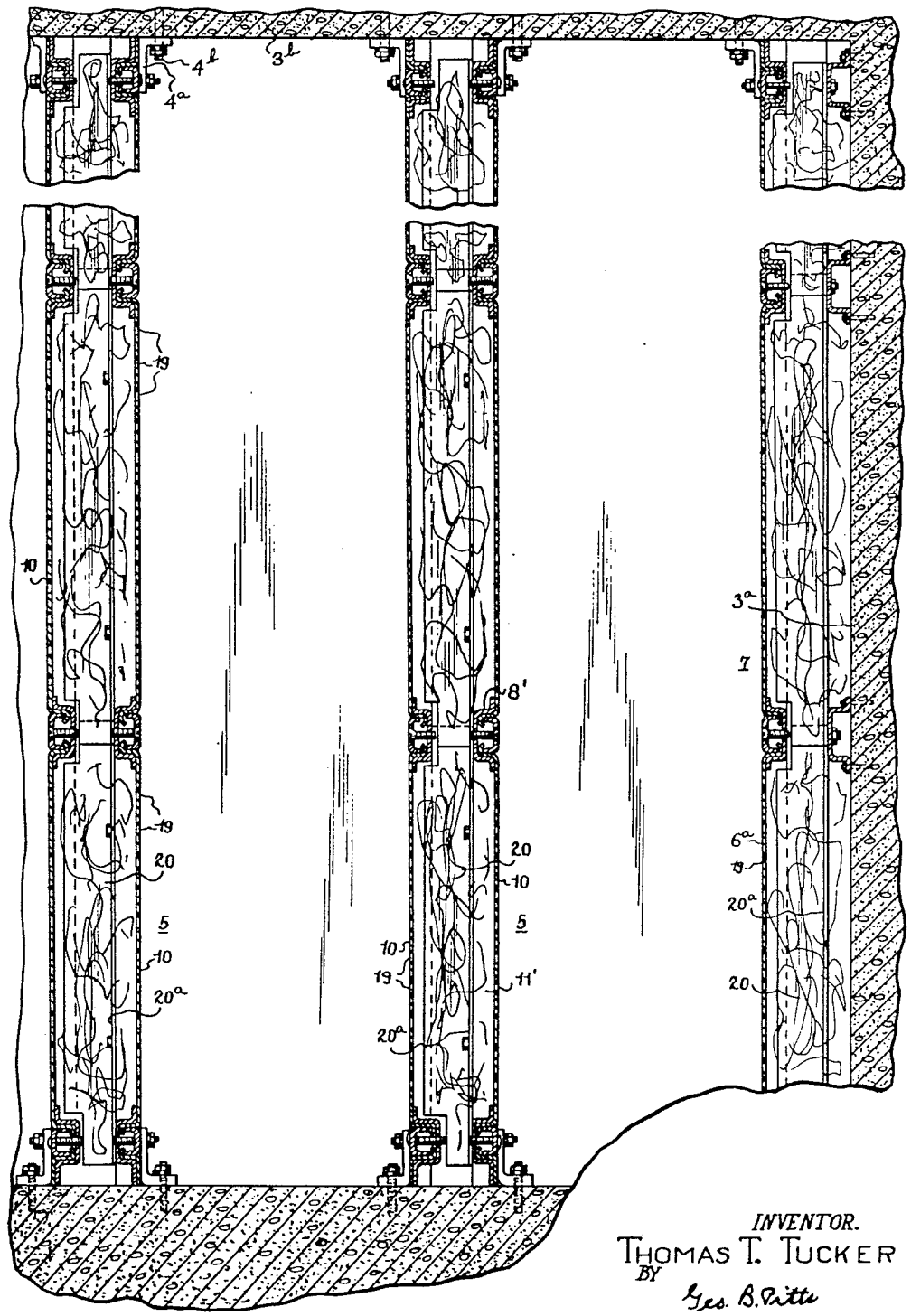
Fig. 7 is a horizontal section on the line 7—7 of Fig. 6.

4 indicates a battery or set of acoustical units or members disposed within but adjacent the open end of the section $1a$ and 5 indicates a battery or set of acoustical units or members within but adjacent the open end of the section $1b$. 6 indicates an acoustical liner on the inner face of each side wall $2a$ (see Fig. 2) substantially co-extensive with the battery 4 and 7 indicates an acoustical liner on the inner face of each side wall 3, $3a$ (see Figs. 6 and 7), substantially co-extensive with the battery 5. In the arrangement shown the section $1a$ forms a tunnel-like enclosure between the batteries 4, 5, to accommodate an apparatus (such as an engine A) to be tested.

Either open end of the building 1 may be employed as the inlet for air, but for illustrative purposes, the engine A is shown in position to induce air flow into the open end of the section $1a$ and exhaust thereof through the open end of the section $1b$. The units 4 extend from the flooring 2 to the top wall or ceiling $2b$ of the building section $1a$ and are disposed longitudinally of the latter in parallel spaced relation and also spaced from the liners 6 to permit air flow therebetween. Each unit is secured to the flooring 2 and wall $2b$ by suitable devices, such as angles $4a$ and bolts $4b$ (see Fig. 2a), whereas the units 5 are separately supported on sills (such as I-beams) $5a$, the opposite ends of which rest on angles $5b$ suitably secured to the lateral side walls $3b$, $3c$ (see Fig. 5), in a plane above that of the ceiling $2b$. The units 5 extend between the side walls 3, $3a$, of the building structure $1b$ and are disposed longitudinally of the latter in parallel spaced relation and also spaced from the liners 7 to permit flow of air and sound waves therebetween. Each unit 5 is secured to the walls $3b$, $3c$, by suitable devices, such as angles $5c$ and bolts $5d$. Each unit 5 is preferably seated in a U-member $5e$, supported on the adjacent I-beam $5a$, and secured to the latter by angles $5f$ extending longitudinally of the I-beam. The outer end of each unit 4 is provided with a nose member $4x$ and its inner end is provided with a tail member $4x'$, whereas the upper end of each unit 5 is provided with a tail member $5x$.

Each of the units 4 comprise a wall of any desired thickness and area having spaced fabricated streamline surfaces 4' formed of relatively thin foraminous metal sheets and sound absorbing material B between these surfaces, the sheets of each surface being supported and inter-connected, as later set forth, so as to utilize the tensile strength thereof to provide a wall light in weight but capable of withstanding high wind velocities and super-sonic sound intensities.

Figure 5:
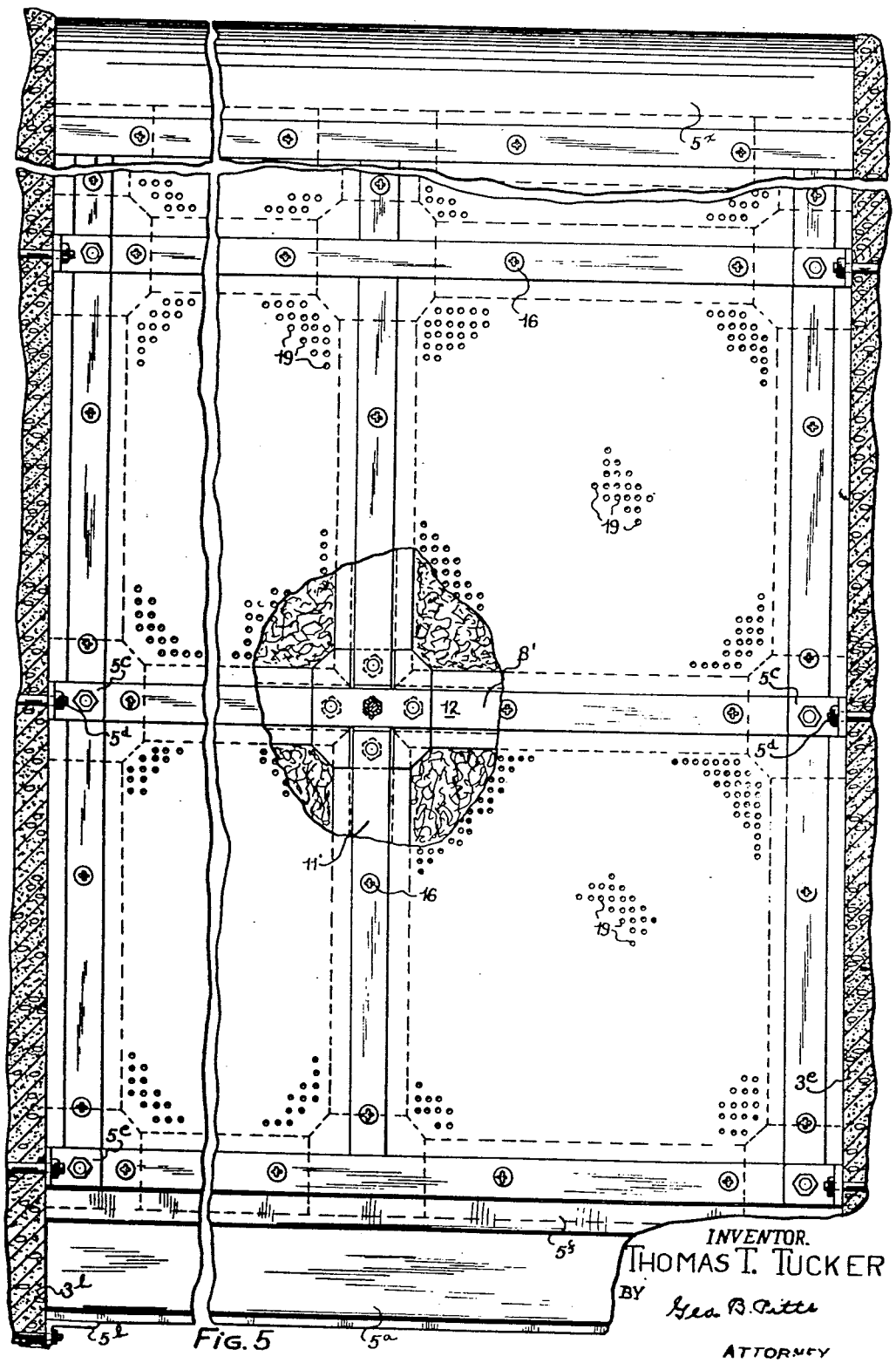
Fig. 5 is a section on the line 5—5 of Figs. 1 and 6.

The units 4 are similar in construction so that only one thereof will be referred to (corresponding parts of the other units being indicated by the same reference characters) as follows: 8 indicates a skeleton frame consisting of rows of spaced supporting elements 8a, each element in each row being in alinement with and disposed in spaced relation to one of the elements 8a in the other row. The elements 8a in each row are spaced center-to-center to suit various operating conditions. Each element 8a is U-shape in cross section, the side walls thereof open outwardly and terminate in laterally extending flanges 8b. In the illustrated form of construction the elements 8a are vertically disposed, but may be arranged horizontally, as shown in Fig. 5. Each pair of alined supporting elements are rigidly secured together in spaced relation by a plurality of spaced bolts 9 each provided with a sleeve 9a between the elements 8a, which are clamped against the opposite ends of the sleeve by a nut on one end of the adjacent bolt.

Figure 2:
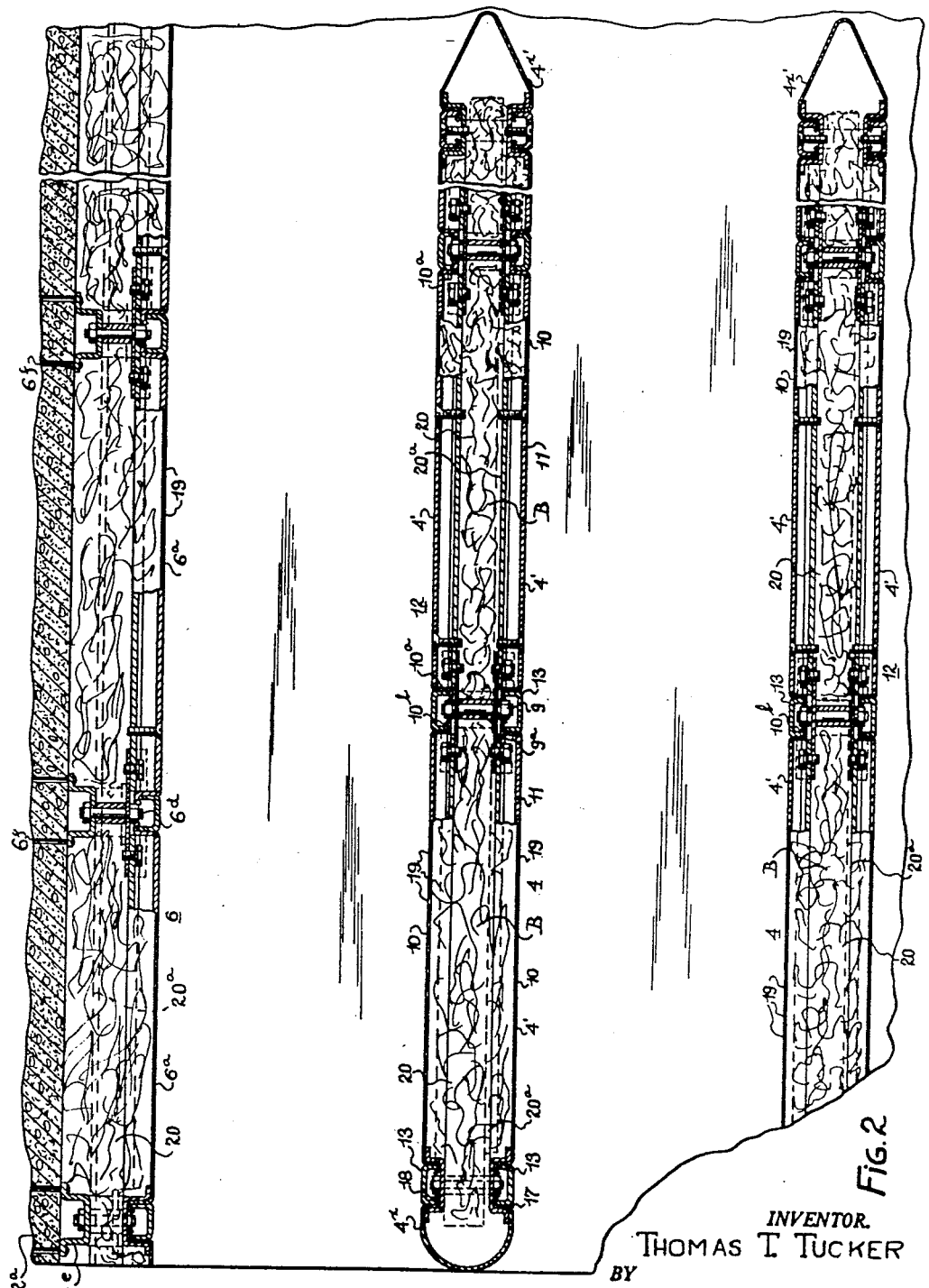
Fig. 2 is a fragmentary section on the line 2—2 of Figs. 1 and 3, enlarged.

The elements 8a support the foraminous facing sheets, indicated at 10, under tension, as later set forth. Under desirable conditions, the sheets 10 between adjacent elements 8a may extend from the flooring 2 to the top wall 2b, but preferably I employ two or more facing sheets to form a surface for the fabricated wall. Where the sheets aproximate forty inches in length or more, I provide spaced spreader or compression members 11 between the elements 8a in each row to insure the tensioned condition of the sheets 10, each in alinement with a spreader or compression member 11 and rigidly connected thereto similarly to the connection between alined elements 8a and forming a truss between adjacent tensioned sheets. Where the elements 8a extend vertically, as shown, the spreader members 11 extend horizontally. Each spreader member 11 is similar in shape in cross section to the elements 8a, open outwardly and its opposite ends are rigidly secured to adjacent elements 8a by connections, each indicated as an entirety at 12, arranged to mount the spreader members 11 in the plane of the adjacent elements 8a. It will be observed therefore that the laterally extending flanges 11b of the members 11 are disposed in the plane of the flanges 8b of the adjacent upright elements 8a and form bearing surfaces for the sheet metal foraminous facing sheets or panels 10 later referred to. As shown in Figs. 2 and 3, the flanges 10b at the opposite ends of each member 11 and the flanges 8b of the adjacent elements 8a are cut away, whereby the elements 8a and members 11 may be secured together in a common plane by the connections 12. Each connection 12 preferably consists of a plate 12a to which the adjacent element 8a is secured by one of the bolts 9 and screws 12b and the alined ends of adjacent members 11 are secured to the plate 12a by screws 12c.

Figure 4:
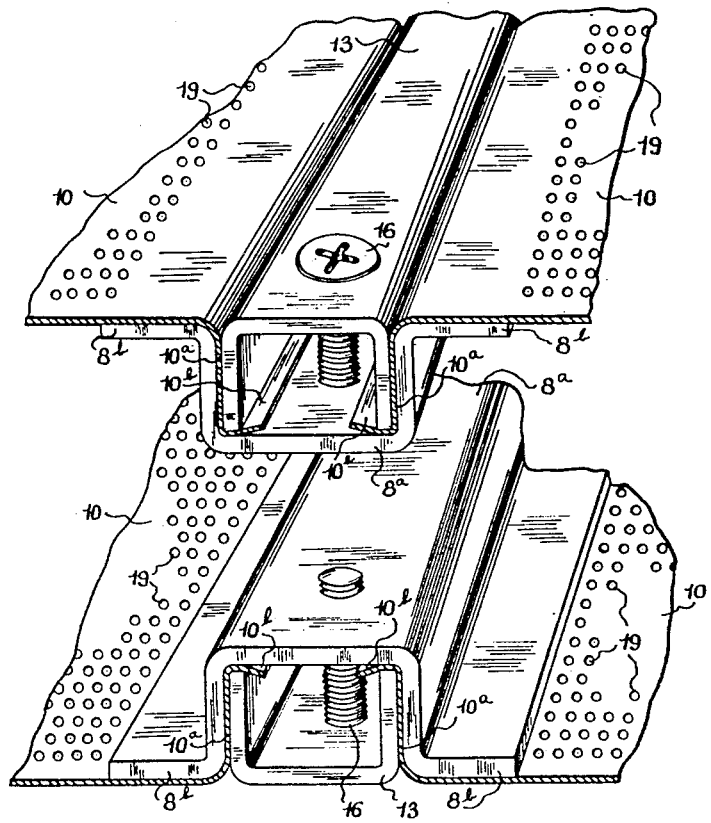
Fig. 4 is a fragmentary perspective view, showing certain parts in assembled relation, enlarged.

Each foraminous sheet 10 is provided along and throughout its opposite marginal sides with flanges 10a, each of which terminates in a laterally outwardly extending hook or extension 10b co-extensive in length to the adjacent flange 10a. The opposite lateral sides of each sheet 10 are provided with flanges 10a', each of which terminates in a laterally outwardly extending hook or extension 10b' co-extensive in length to the adjacent flange 10a'. In assembly the flanges 10a of adjacent sheets 10 are initially positioned in the supporting elements 8a and then engaged by channel bars 13, each adapted to removably fit within one of the elements 8a and engage the adjacent flanges 10a. The channel bars 13 are moved inwardly, under pressure, the longitudinal edges of the bar legs serving to engage the hooks 10b and apply force inwardly on the flanges 10a, the effect of which is to exert tension on the sheets 10 throughout their areas, the continued inward movement of the channel bars 13 serving to clamp the hooks 10b to the bottom walls of the elements 8a. The channel bars 13 are secured in seated position in the elements 8a by suitable means, such as screws 14, threaded into the bottom walls of the elements 8a (see Fig. 4), and thus maintain the sheets 10 under tension. Where lateral members are employed, the flanges 10a' of the foraminous sheets 10 are seated therein and engaged by channel bars 15, which are secured to the spreader members by screws 16. From the foregoing description it will be observed that each of the foraminous sheets is inter-connected in the adjacent wall surface 4' and maintained under tension throughout its area between adjacent elements 8a as an incorporated member of such surface; as the sheets in each surface 4' are disposed in a common plane and under tension, their tensile strength is utilized as a functional part of the wall assembly to provide a unit having a high strength-weight ratio. As shown in Fig. 2, the terminating longitudinal marginal edges of the nose 4x of each unit are provided with flanges 17 having terminating hooks 18 extending into the adjacent elements 8a and engaged by channel bars 13 which anchor these flanges and those of the adjacent foraminous sheets to the elements 8a. The tail member 4x' for each unit is secured in position in a similar manner.

The facing sheets may be cut from sheet metal, such as sheet steel, stainless steel or aluminum of any desired thickness or gage.

The perforations 19 in the facing sheets 10 preferably have a diameter of sixty-eight thousanths of an inch and spaced to provide 4800 per square foot of surface between the related flanges 8b and 11b. In this arrangement, a large area is provided for passage of the sound waves entirely through each unit 4 and at the same time prevent the longer fibers of the sound absorbing material from being sucked therethrough.

The surface 6a for each of the liners 6 is fabricated similarly to each of the surfaces 4' for a unit 4 and therefore a description of the construction of this surface need not be repeated, the supporting elements being indicated at 6b and foraminous facing sheets being indicated at 6c. As shown, the elements 6b are connected by bolts 6d to U-members 6e, which in turn are secured to the adjacent wall 2a by devices 6f.

Figure 2A:
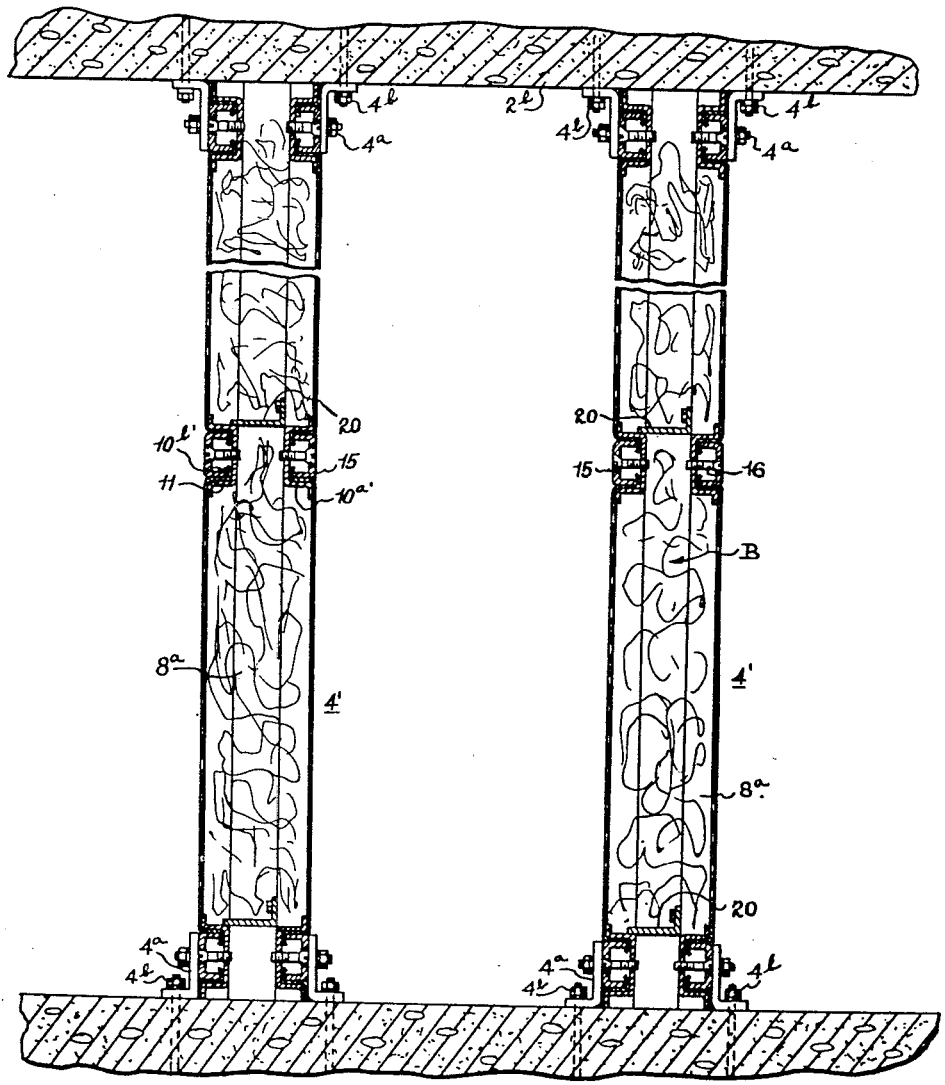
Fig. 2a is a fragmentary section on the line 2a—2a of Figs. 2 and 3.

As shown in Fig. 2, sound absorbing material B is placed in each unit 4 between the surfaces 4' and also between each liner surface 6a and the adjacent side wall 2a. The density of the material B may be varied to suit various conditions as to air velocity and sound intensity. In each unit 4 and each liner 6, I provide horizontal supports 20 for the sound absorbing material B, at different levels, and bridging the space between the elements 8a, as shown in Fig. 2a. The supports 20 at each level consist of plates each supported along one longitudinal edge on the adjacent spreader member 11, its opposite longitudinal edge being provided with a flange 20a which is suitably secured to the adjacent elements 8a.

The sound absorbing material B employed by me embodies characteristics peculiarly adapted for testing structures of the type herein referred to, to efficiently meet the problems and conditions involved. The material B consists of fiber glass, that is, pure glass in fibrous form, the fibers being intermingled into a mass forming throughout the area of each panel or cell a labyrinth of minute air spaces between them when placed within the panel or cell between the sheetings 10. As the sheetings on both sides of each panel are formed with openings and the entire area therebetween is filled with fibrous glass, the latter provides a filtering media for the passage of sound waves in either direction through the unit or panel. Glass is relatively high in tensile strength, which insures stability of the fibrous mass. The material B may have any predetermined density throughout its area, and held in position by the pressure of the sheetings thereon to avoid danger of matting or settling of the material, or becoming deformed or disintegrated irrespective of impacts on the material due to complex sound vibrations, wind or eddy currents, or air pressure of varying millibars, it being obvious that the greater the density of the fibrous material the greater will be the pressure exerted by the sheetings thereon. It will thus be observed that due to this stabilized condition of the material B, its filtering characteristic and its maintained positioning between the sheets, as above set forth, it is not only effective for deadening sounds of varying intensities for each test, but permits successive tests to be made under like conditions. By preference, the fiber glass is loosely packed in the panels or cells for sounds having a high frequency and heavily packed in the cells for lower sound frequencies. Also, by using relatively thin flat sheet metal for the sheetings, as shown in the drawings, I am enabled to form therein relatively small openings of a size proportioned to the diameter or length of the glass fibers to prevent the latter from being sucked therethrough.

Furthermore, fiber glass is fireproof so that danger of fire resulting from oil, gasoline vapor and water vapor is avoided and it is also capable of withstanding deleterious effects or chemical reaction from ingredients in these and other chemicals, since hydrofluoric acid is the only acid known capable of attacking glass, so that any desired kind of cleaning material or solution may be used to remove accumulations on the material without danger of affecting its physical and/or sound absorbing qualities; likewise, this material is not affected by contact with metal, which permits it to be supported in direct contact with metal walls and flat sheetings 10 (as already set forth) or by exposure to climatic conditions and being non-hygroscopic the material does not absorb water, so that when the material is subjected to rain the water readily drains out and very little moisture is retained in the material. In addition to these stable mechanical qualities, which insures durability this material has an unlimited compressibility and flexibility which permit it to be subjected to loads or impacts of varying intensities due to sound vibrations induced separately or in complex patterns or wind and air velocity without danger of affecting its sound absorbing quality. It will be observed therefore that the impacts on the material whether induced by sound, as in the testing of an engine, or induced by air circulation, as in the testing of a propeller or other driven device, will not affect its stable or physical condition or its sound deadening capability or its position between the sheetings.

Tests made by me of fiber glass between sheetings, as above set forth, under actual operating conditions show sound deadening properties exceeding approximately 50 decibels, which is a substantial increase of sound deadening properties of fiber glass over other materials, which increase I attribute to the inert chemical characteristics of fiber glass in this form and its tensile strength and mechanical stability plus the physical relationship of its fibers whereby numberless minute air areas are formed between them. Each unit 5 is supported on a sill as already set forth; except for this mounting and the different arrangement of the supporting elements 8' and spreader members 11', each unit 5 is similar in construction to the units 4; likewise, the liners 7 are similar in construction to the liners 6. Accordingly, further description of the units 5 and liners 7 will not be necessary.

It is to be noted that the supporting elements, spreader members and channel bars are of standardized shapes and may be cut to predetermined lengths ready for installation and assembly; also, that the channel bars are removable to permit disassembly of the facing sheets to permit inspections or replacements.

To those skilled in the art to which my invention relates many changes in construction and widely differing applications and embodiments thereof will be apparent without departing from the scope of the invention. The disclosure and description herein are illustrative and not intended to be in any sense limiting.

What I claim is:

1. In apparatus of the class described, the combination with a housing, of a set of acoustical units disposed side by side in parallel spaced relation within said housing, each unit comprising parallelly related spaced walls, sound absorbing material filling the space between said walls and devices for spacedly connecting said walls together, each wall consisting of a plurality of foraminous sheet metal sections disposed in a common plane in horizontal and vertical rows, rows of supporting members extending in a vertical direction and alined with the vertically disposed marginal edges of said wall sections, rows of supporting members extending in a horizontal direction and alined with the horizontally disposed marginal edges of said wall sections, the supporting members extending in one of said directions being channel shaped in cross section and opening outwardly, and a plurality of elongated devices each alined with one of said supporting members and engaging the adjacent marginal edges of adjoining wall sections to secure the latter to said supporting members, those devices alined with said channel shaped members being U-shaped in cross section and adapted to seat therein, each U-shaped device along one marginal edge of each wall section and the U-shaped device along the opposite marginal edge of said wall section being arranged to engage the opposite marginal edges of said wall section when moved into the adjacent channel shaped members to tension said wall section throughout its area between the latter and secure its opposite marginal edges to said members.

2. An apparatus as claimed in claim 1 wherein those sides of said housing parallel to said units are provided with acoustical liners each comprising a wall parallel to and spaced from the adjacent housing side and sound absorbing material filling the space between said wall and the housing side, and said wall consisting of a plurality of foraminous sheet metal panels disposed in a common plane in horizontal and vertical rows, rows of supporting members extending in a vertical direction and alined with the vertically disposed marginal edges of said wall sections, rows of supporting members extending in a horizontal direction and alined with the horizontally disposed marginal edges of said wall sections, the supporting members extending in one of said directions being channel shaped in cross section and opening outwardly, and a plurality of elongated devices each alined with one of said supporting members and engaging the adjacent marginal edges of adjoining wall sections to secure the latter to said supporting members, those devices alined with said channel shaped members being U-shaped in cross section and adapted to seat therein, each U-shaped device along one marginal edge of each wall section and the U-shaped device along the opposite marginal edge of said wall section being arranged to engage the opposite marginal edges of said wall section when moved into the adjacent channel shaped members to tension said wall section throughout its area between the latter and secure its opposite marginal edges to said members.

3. In apparatus of the class described, the combination with a housing, of a set of acoustical units disposed side-by-side in parallel spaced relation within said housing, each unit comprising spaced sets of elongated U-shaped members the channels of which open outwardly, devices for connecting the sets of members together in spaced relation, the members of each set being arranged in rows extending in a vertical direction and in rows extending in a horizontal direction and each member in each row of one set being alined with one of the members in the other set, a plurality of foraminous sheet metal sections disposed in a common plane and spanning the areas between said U-members in each set of rows thereof, the opposite vertically disposed marginal portions of each section being provided with flanges adapted to extend into the adjacent U-members and engage the near sides thereof, elongated elements U-shaped in cross section arranged to engage the flanged portions of each section and move them inwardly to tension the section between said U-members and secure the flanges thereto, separate elongated elements for securing the horizontally disposed marginal portions of each section to the adjacent U-members, means for securing each element to the adjacent U-member, and sound absorbing material disposed between the foraminous sections of each unit.

4. In apparatus of the class described, the combination with a housing, of a set of acoustical units disposed side-by-side in parallel spaced relation, each unit comprising spaced frames each formed of elongated spaced elements disposed in vertical and horizontal rows and secured together in angular relation, each of said elements being U-shaped in cross section, foraminous sheet metal sections disposed in the areas between said elements of each frame and each having marginal portions extending into the adjacent vertically and horizontally disposed elements, horizontally disposed elongated members engaging the opposite horizontally disposed marginal portions of said sections to secure them to said elements, vertically disposed devices of U-shape in cross section and extending into the adjacent elements and arranged when positioned therein to engage the other opposite marginal portions of said sections to simultaneously tension the latter between adjacent devices, respectively, and secure said marginal portions to the adjacent elements, and sound absorbing material in the space between said sections.

5. An apparatus as claimed in claim 1 wherein each unit between its spaced walls is provided at different levels with horizontally disposed supports for the sound absorbing material.

6. In apparatus of the class described, the combination with a housing having an inlet opening and an outlet opening, of a set of spaced acoustical units within said housing, each unit comprising spaced walls and sound absorbing material therebetween, each of said walls consisting of a plurality of supporting elements extending in vertically and horizontally disposed rows, the supporting elements in said vertically disposed rows being U-shape in cross section, metallic foraminous facing sheets disposed in the areas between said vertically and horizontally disposed elements, the opposite end walls of each section being provided with inturned flanges extending into the adjacent U-shaped elements and terminating in out-turned hooks, elongated devices, U-shaped in cross section, adapted to seat into said U-shaped elements, said devices when moved into seated position being arranged to engage said hooks and move said flanges inwardly to simultaneously effect tension on said sections throughout their areas between said elements and secure said flanges thereto, separate devices for securing the opposite side edges of said sections to the adjacent horizontally disposed supporting elements, and devices for connecting the supporting elements of one wall to the supporting elements of the other wall.

7. In apparatus of the class described, the combination with a housing, of a set of spaced, parallelly related acoustical units between which sound waves are adapted to pass, mounted in said housing, each unit comprising spaced skeleton frameworks, a surface outwardly of and substantially co-extensive in area to each framework, sound absorbing material filling the space between said surfaces, each said framework consisting of vertical and horizontal rows of supporting elements rigidly connected at the intersections, and a device at each of said intersections for connecting said frameworks in spaced fixed relation, each said surface consisting of metallic foraminous facing sheets each having inturned flanges along their opposite horizontal and vertical edges engaging the inner sides of the adjacent supporting elements, elongated devices fitting into the horizontally disposed supporting elements between the adjacent flanges on said facing sheets to close the spaces between the horizontal edges thereof and elongated members U-shaped in cross section adapted to seat into said vertically disposed supporting elements and secure the adjacent flanges on said facing sheets thereto, each U-shaped member and the adjacent U-shaped members in adjoining rows being arranged, when moved into seated position, to engage the flanges on the opposite ends of the adjacent facing sheets and exert a tensile force thereon, whereby the sheets are tensioned between adjacent supporting elements.

THOMAS T. TUCKER.

REFERENCES CITED

The following references are of record in the file of this patent:

UNITED STATES PATENTS

| Number | Name | Date |
|---|---|---|
| 2,270,825 | Parkinson | Jan. 20, 1942 |
| 2,334,502 | Parkinson | Nov. 16, 1943 |